(12) United States Patent
Takahashi et al.

(10) Patent No.: US 7,184,945 B1
(45) Date of Patent: Feb. 27, 2007

(54) SERVICE DISTRIBUTION DEVICE

(75) Inventors: Eiichi Takahashi, Kawasaki (JP); Ken Yokoyama, Kawasaki (JP); Naohiro Tamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 684 days.

(21) Appl. No.: 09/671,120

(22) Filed: Sep. 28, 2000

(30) Foreign Application Priority Data

Sep. 30, 1999 (JP) ................................. 11-279516

(51) Int. Cl.
G06F 9/45 (2006.01)
G06F 9/44 (2006.01)
G06F 9/46 (2006.01)
G06F 13/10 (2006.01)
G06F 13/12 (2006.01)

(52) U.S. Cl. .............................. 703/22; 703/2; 703/21; 718/102; 718/103; 718/104; 718/105; 370/389; 370/465

(58) Field of Classification Search ................ 703/13, 703/22, 2, 21; 709/226, 223, 213; 718/102–105; 370/389, 465
See application file for complete search history.

(56) References Cited

U.S. PATENT DOCUMENTS

| | | | | |
|---|---|---|---|---|
| 5,303,166 A | * | 4/1994 | Amalfitano et al. | 702/186 |
| 5,341,477 A | * | 8/1994 | Pitkin et al. | 709/226 |
| 5,440,719 A | * | 8/1995 | Hanes et al. | 703/21 |
| 5,465,365 A | * | 11/1995 | Winterbottom | 707/101 |
| 5,475,819 A | * | 12/1995 | Miller et al. | 709/203 |
| 5,544,320 A | * | 8/1996 | Konrad | 709/203 |
| 5,548,724 A | * | 8/1996 | Akizawa et al. | 709/203 |
| 5,761,486 A | * | 6/1998 | Watanabe et al. | 703/21 |
| 5,956,662 A | * | 9/1999 | Hemker et al. | 702/182 |
| 6,006,251 A | * | 12/1999 | Toyouchi et al. | 709/203 |
| 6,069,895 A | * | 5/2000 | Ayandeh | 370/399 |
| 6,157,940 A | * | 12/2000 | Marullo et al. | 703/27 |
| 6,173,311 B1 | * | 1/2001 | Hassett et al. | 709/202 |
| 6,182,136 B1 | * | 1/2001 | Ramanathan et al. | 709/224 |
| 6,259,705 B1 | * | 7/2001 | Takahashi et al. | 370/465 |
| 6,279,001 B1 | * | 8/2001 | DeBettencourt et al. | 707/10 |
| 6,286,047 B1 | * | 9/2001 | Ramanathan et al. | 709/224 |
| 6,314,463 B1 | * | 11/2001 | Abbott et al. | 709/224 |
| 6,317,786 B1 | * | 11/2001 | Yamane et al. | 709/224 |
| 6,336,138 B1 | * | 1/2002 | Caswell et al. | 709/223 |
| 6,385,643 B1 | * | 5/2002 | Jacobs et al. | 709/203 |
| 6,606,316 B1 | * | 8/2003 | Albert et al. | 370/389 |
| 6,625,147 B1 | * | 9/2003 | Yokoyama et al. | 370/389 |

OTHER PUBLICATIONS

Kleinrock, L. "On the Modeling and Analysis of Computer Networks." Proc. of the IEEE. Aug. 1993. pp. 1179-1191.*
Microsoft Press Computer User's Dictionary. © 1998. p. 344.*

(Continued)

*Primary Examiner*—Paul Rodriguez
*Assistant Examiner*—Ayal Sharon
(74) *Attorney, Agent, or Firm*—Staas & Halsey LLP

(57) ABSTRACT

A service distribution device and method for balancing load distribution among servers without placing the servers in a high load or overloaded state. Models of the servers and services are generated from the record of monitored packets. Simulations are performed to predict the server load, and based on the results of the predictions, settings are determined to distribute the services among the servers so that load is balanced.

19 Claims, 12 Drawing Sheets

OTHER PUBLICATIONS

Jain, R. The Art of Computer Systems Performance Analysis. © 1991. pp. 624-626.*

Narendran et al. "Data Distribution Algorithms for Load Balanced Fault Tolerant Web Access." 1997 Proceeding 16th Symposium on Reliable Distributed Systems. Oct. 1997. pp. 97-106.*

Bonomi et al. "Adaptive Optimal Load Balancing in a NonHomogeneous Multi-Server System with a Central Job Scheduler." IEEE Transactions on Computers. Oct. 1990.*

Bonomi et al. "Optimality of Least Squares Load Balancing." Proc. of Decision and Control. Dec. 1988.*

Menasce, D. et al. Capacity Planning and Performance Modeling. © 1994. Chapters 3,4,9.*

Anderson, H. A. et al. "Tuning a Virtual Storage System". IBM Systems Journal. vol. 14, No. 3, p. 246. © 1975.*

Zhu, H. "Adaptive Load Sharing for Clustered Digital Library Services". The 7th Int'l Symposium on High Performance Computing. Jul. 31, 1998. pp. 235-242.*

Hua, K.A. "A Performance Evaluation of Load Balancing Techniques for Join Operations on Multicomputer Database Systems." Proc. 11th Int'l Conf. on Data Eng'g. Mar. 1995. pp. 44-51.*

* cited by examiner

SIMULATION MODEL (1 SERVICE, 1 SERVER)

SERVICE DISTRIBUTION DEVICE

CROSS-REFERENCE TO RELATED APPLICATION

This application claims the benefit of Japanese Patent Application No. 11-279516, which was filed in the Japanese Patent Office on Sep. 30, 1999, and which is incorporated herein by reference.

BACKGROUND OF THE INVENTION

1. Field of the Invention

This invention pertains to a service distribution device which distributes service requests from clients among several servers using a network.

2. Description of the Related Art

In recent years, network services have grown in scale and become more complicated, resulting in a demand for high performance servers. The response has been to distribute a service among several servers, using load distribution technology to realize the performance of multiple servers. To realize the performance of multiple servers, a technology for distributing and balancing services according to the processing performance of the individual servers has been sought.

A distribution method is known that determines the response time of the servers and distributes the service to the server having the shortest response time. Also known is a distribution method that predicts, based on the current response time and the response time when a server is overloaded (when there are processing errors) or when the processing load is high (when the service time increases as waits are generated), which server will be least likely to become overloaded or have a high processing load.

Nevertheless, the conventional technology has several problems. One problem is that when there is a difference in processing capacity among the servers, the load tends to go to the fastest server. Also, when there is a difference in the service processing content, the server load predictions may be incorrect and the load may not be balanced. Another problem is that because it is difficult for the user to set a threshold value, every server has to become overloaded or placed in a high load state at least once or a threshold value cannot be determined and distribution becomes impossible. In order to intentionally determine the threshold value, it is necessary to halt the service and run a benchmark or other test.

SUMMARY OF THE INVENTION

To resolve the aforementioned problems, this invention employs the following configurations.

According to one aspect of the present invention, the service distribution device comprises a packet capture device, which captures packets as they go through the network; a server identifying module that records packet information from the packets into server logs for each server; a service identifying module that records packet information from the packets into service logs for each service; a server modeling module that sets up the simulation/model for each server from the server records; a service modeling module that sets up the simulation/model for each service from the service records; a simulator, which reads in the server model and the service model and runs the simulation; and a server selection module that selects and specifies the optimum server for distribution based on the results of the simulator. This type of configuration is not limited by the servers or services, does not affect the service traffic, does not produce high load or overloaded states in servers, and allows the determination of servers for distribution while automatically balancing the load for each server.

According to a second aspect of the present invention, the service distribution device is equipped with a packet capture device on a packet relay device that relays packets between the client and the server. The packet capture device also gets packets from the packet relay device. This configuration allows packets to be accurately captured without dropping any packets and increases the precision of the server and service models.

According to a third aspect of the present invention, the server modeling module of the first aspect has a server model with a queue corresponding to the transmission process. With the server transmission throughput and the server processing time and unit processing time as parameters, the module is configured so that it can set up an accurate model of a server using the server log record and perform the following calculations:

(1) Calculate the server transmission throughput using the formula $L/(t-e-t-s)$, where L is the total size of an arbitrary, continuous string of the continuously transmitted packets, $t-s$ is the starting packet capture time, and $t-e$ is the ending packet capture time.

(2) Calculate the server processing time using the formula $(ts-tc)-(ls+lc)/B$, where ts is the capture time of the server response packet, ls is the size of the server response packet, tc is the capture time of the corresponding client response packet, lc is the size of the corresponding client response packet, and B is the network speed. This configuration allows an accurate model of the server to be set up without knowing the detailed specifications of the server.

According to a fourth aspect of the present invention, the service modeling module of the first aspect is configured to calculate the following parameters by constructing a service model for each service:

(a) the ratio of the number of sessions for each service as a ratio of the number of sessions for total services;
(b) the session starting frequency or time interval;
(c) the number of transmissions between the client and server per session;
(d) the client response size, packet size, and packet count per transmission;
(e) the server response size, packet size, and packet count per transmission; and
(f) the time from the server response until the client response.

The "starting frequency" is the average number of sessions in a unit time. For example, when the starting frequency is 10, an average of 10 sessions may start in a unit time.

This configuration allows an accurate model of the service without knowing the detailed specifications of the service or the effective differences.

According to a fifth aspect of the present invention, the simulator of the first aspect uses a service model and a server model to determine the mean or the median value of the session time for the specified service. This configuration allows the service quality as seen from the client to be evaluated.

According to a sixth aspect of the present invention, the server selection module of the first aspect simulates a single session for each service using the simulator and takes the results of that simulation as the standard value of the service to determine that a high load occurs when a certain threshold ratio or difference (which is set in advance) among the simulation results and the standard values for several sessions is exceeded. This configuration allows the automatic judgment of the level of the load for the simulation results.

According to a seventh aspect of the present invention, when the server selection module of the sixth aspect receives a server distribution query, it calculates the starting frequency of the session of the corresponding service for each server using a specified search method. Using that as the permission of the server, the server with the biggest difference between the session starting frequency and the permission of the current service in question is selected as the server for distribution. The server "permission" is the capacity, maximum service frequency, or minimum service interval possible without causing the server to go into a high load or an overloaded state. This configuration allows the selection of the server with the most available resources to be selected with the least amount of effort.

According to an eighth aspect of the present invention, when the server selection module of the sixth aspect receives a server distribution query, it runs a simulation on the service in question for each server and specifies as the distribution server, the server for which the ratio of β (specified value) times the standard value is less than or equal to γ (specified value). β and γ are described in more detail below.

According to a ninth aspect of the present invention, when the server selection module of the sixth embodiment receives a server distribution query, it runs a simulation on the service in question for each server and specifies as the distribution server, the server for which the ratio of β (specified value) times the standard value is smallest. This configuration allows the selection of the server with the most available resources of all the servers that are least likely to see a decline in service quality during distribution.

According to a tenth aspect of the present invention, the service modeling module of the fourth aspect has a configuration in which each transmission of the session is categorized according to processing content as (a) connection requests and connection establishment responses, and (b) command transmissions, data transmissions, responses, and endings. The respective parameters are calculated. This configuration allows an increase in the service model precision.

According to an eleventh aspect of the present invention, the server selection module of the seventh aspect calculates the starting frequency of a high load session for the service in question for each server using a specific search method. Taking the starting frequency as the server permission, either (a) the permission for each server is taken as the distribution weighting or (b) the relative ratios of the permissions are used as the server distribution ratios.

These, together with other objects and advantages that will become apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

A first embodiment of the present invention encompasses FIGS. 1–13.

Figure 1:
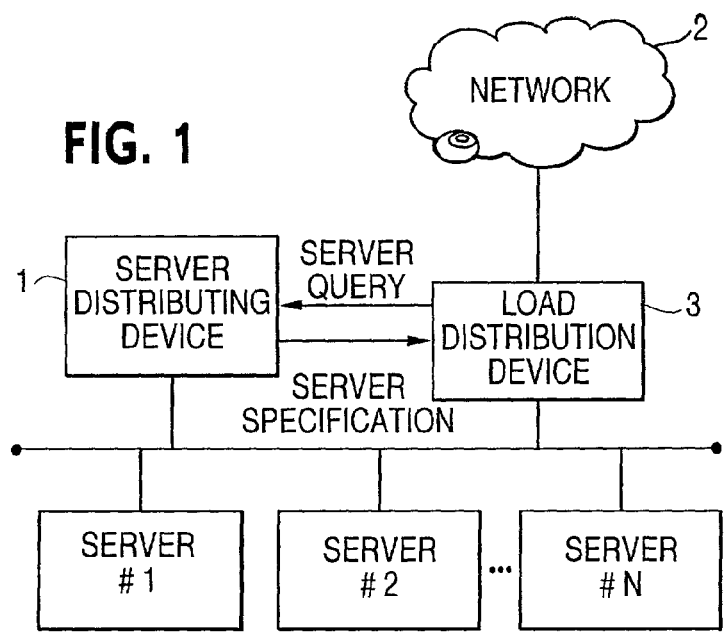
FIG. 1 shows the position of the server distributing device within the present invention.

FIG. 1 is a diagram showing the position within the network system of the server distribution device 1 according to the present invention. The server distribution device 1 is connected to the same link as the servers 1 . . . N, which perform the service through network 2. When the server distribution device 1 receives a query as to which server should be the recipient of a packet from the load distribution device 3, it selects a suitable server from among servers 1 . . . N that will maintain a balanced load and notifies the load distribution device 3 of the selection. The load distribution device 3 relays packets between a server and the network.

Figure 2:
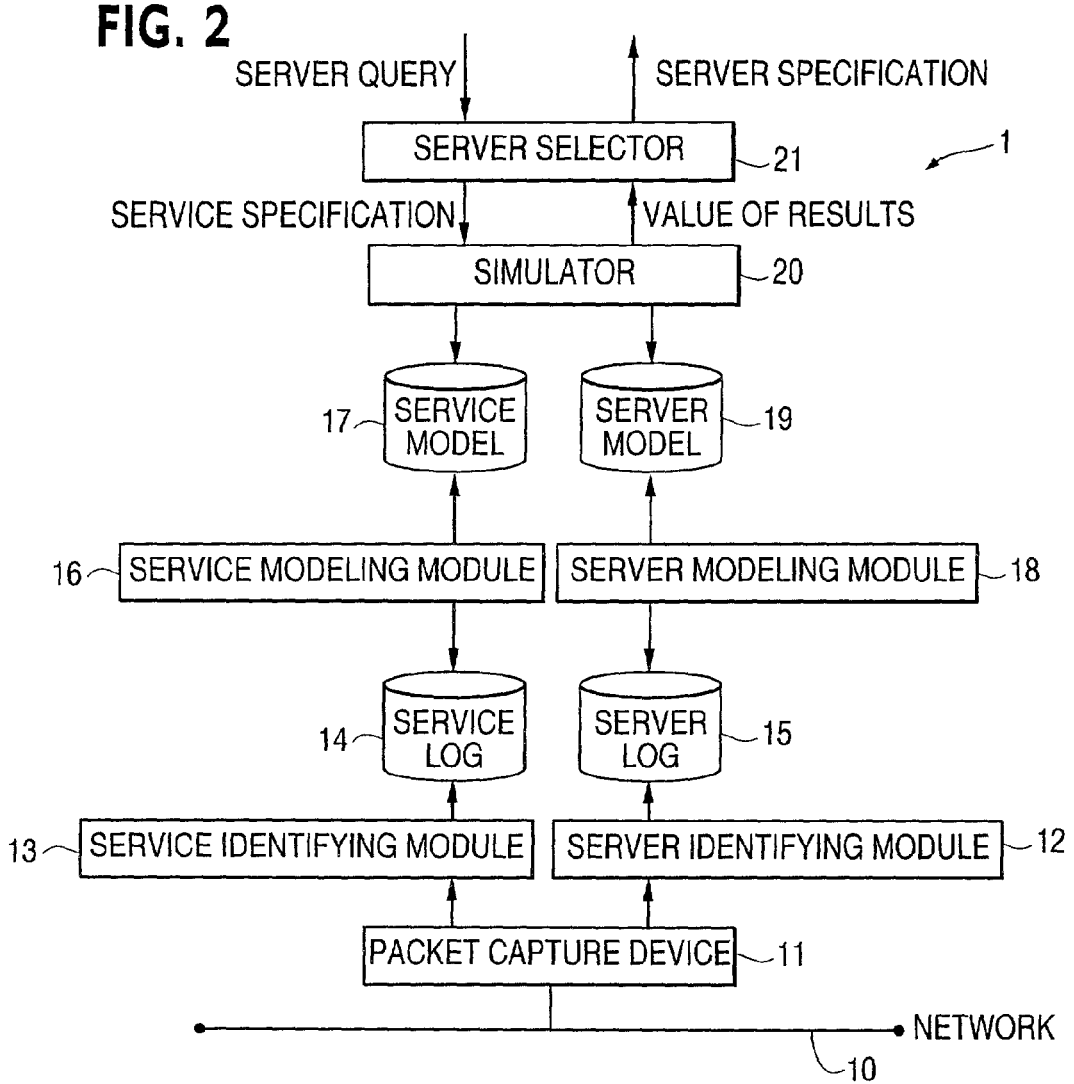
FIG. 2 shows the configuration of the server distributing device according to the present invention.

FIG. 2 shows the configuration of the server distribution device 1 shown in FIG. 1. The server distribution device 1 is connected to a network 10 and the packets flowing through the network 10 are monitored by a packet capture device 11. Packets monitored by the packet capture device 11 are sent to a server identifying module 12 and a service identifying module 13.

The service identifying module 13 determines what sort of service packet it is. For example, if a server address is in the transmission address, the service identifying module 13 reads the transmission number. If the server address is in the recipient address, the service identifying module 13 reads the receipt port number from the header of the IP packet. The port numbers can be used to make distinctions.

The service identifying module 13 records the packet information in question into a log prepared for each service in a service log module 14. The packet information may include the time; the packet size; the client address; the client port number; the sequence number; SYN, ACK, or other flags; and some data.

The server identifying module 12 reads the transmission address or the recipient address from the header of the IP packet. The packet contains data indicating which of the servers 1 . . . N it was sent from or which one it is being sent to. If the server identifying module 12 is specified, the information in the packet (for example, the time it was monitored, the packet size, and other information) is recorded in a server log 15.

The packet capture device 11, service identifying module 13, and server identifying module 12 may operate at any time and instructions to run or stop may be issued from outside the system.

Figure 3B:
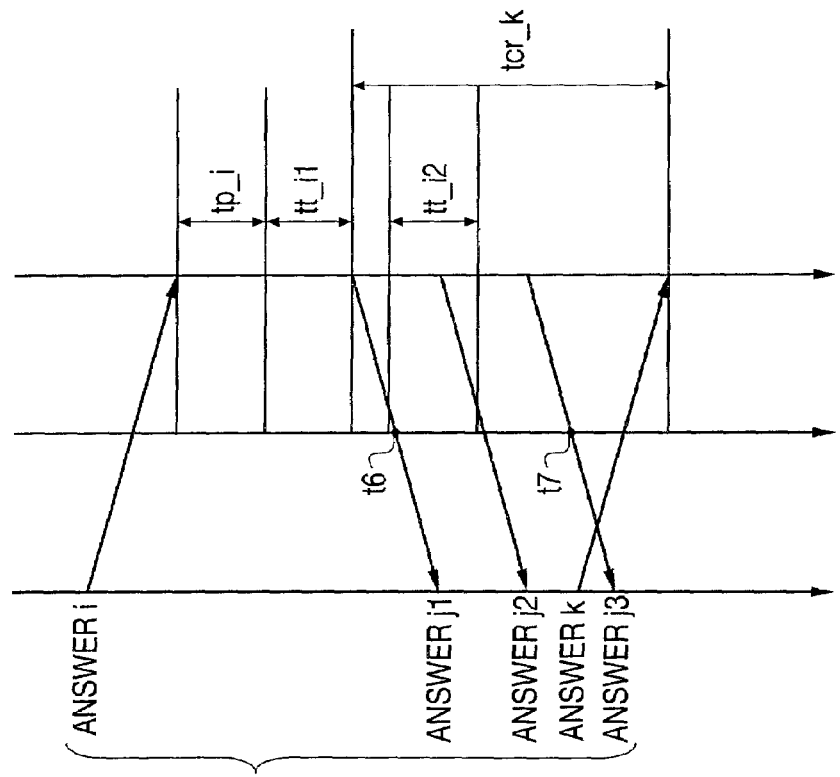
FIGS. 3A and 3B show examples of the parameters of the present invention.
Figure 3A:
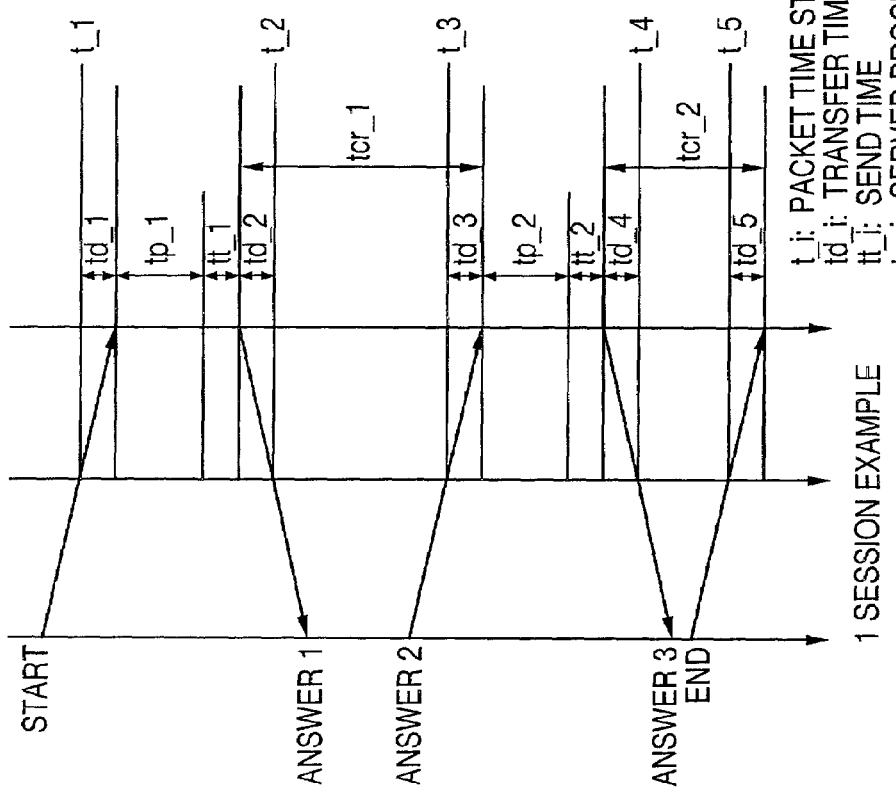

The setting of the service model parameters is explained by referring to FIGS. 3A and 3B. The service modeling module 16 sets up the simulation model parameters for each service record in the service log module 14. The parameters include, for example, the following:

(1) The ratio of a single service to all services on each server (for example, if there are four services, A, B, C, and D, the service modeling module 16 would calculate the A ratio, the B ratio, the C ratio, and the D ratio).

(2) Request (session) frequency or time intervals. The request frequency F is calculated, for example, from the number of service start packets Pn monitored during the time Tx to the time Ty (Ty>Tx), according to the equation F=Pn/(Ty−Tx).

(3) Number of transmissions (sent or received) between a client and server for each session. The number of transmissions Nc between a client and a server would be calculated, for example, from the number of packets transmitted between the beginning and the end of service.

(4) The size of the data and the size and number of packets per transmission to or from the server.

(5) The time it takes for the server or client to respond to a packet. The time it takes for the client to respond to a packet from a server and the time it takes a server to respond to a packet from the client are calculated using the methods shown in FIG. 3A.

FIG. 3A shows an example of a single-session packet transmission (from start to finish) for a single service between a client and a server. In the diagram, the term "monitor" refers to packet monitoring using the packet capture device 11 (FIG. 2). The intersections of the diagonal arrows indicating the direction of packet transmission and the vertical arrows indicating elapsed time show the time the packet was captured.

In FIGS. 3A and 3B, $t\_i$ is the packet time stamp, $td\_i$ is the transmission or transfer time, $tt\_i$ is the send time, $tp\_i$ is the server processing time, and $tcr\_i$ is the client response or answer time.

In the example in FIG. 3A, the monitored times t1 to t5, the size of each of the five packets (start, responses 1 to 3, finish), and other information have been recorded in the service log module 14.

The client response time $tcr\_1$ is calculated using the following equations:

$$tcr\_1=(t\_j-t\_i)+td\_j+td\_i$$

$$td\_i=1\_i/B$$

$$td\_j=1\_j/B$$

Here, $t\_i$ and $t\_j$ are the monitoring times of the corresponding packets, $1\_i$ and $1\_j$ are the packet sizes, and B is the network speed. These are obtained using actual measurements. The values $td\_i$, $td\_j$, and $tcr\_1$ are obtained through calculations.

For each of the aforementioned parameters, several values may be obtained from the logs and the mean or median value determined, or the probability distribution may be obtained and a probability variable may be used.

The service modeling module 16 outputs the specified model to the service modeling module 17.

The setting of the server model parameters is also explained referring to FIGS. 3A and 3B. A server modeling module 18 sets the server model parameters for each of the servers using the record in the server log module 15. The parameters include the following:

(1) the server send throughput α,
(2) the server processing time tp_i, and
(3) the unit processing time.

FIG. 3A shows an example of how the server processing time tp_i and the send time tt_i are obtained.

The server send throughput a may be set to the same speed as the network speed B or a specific setting may be used. As shown in FIG. 3B, in cases where the server sends packets continuously, α may also be obtained using the following formula:

$$\alpha=L/(t7-t6)$$

$$L=S1\_ji-1\_j1$$

Here, t6 is the monitor time of the starting packet of the continuous packets, t7 is the monitor time of the ending packet, and L is the value of the entire size of the continuous string of packets minus the size of the starting packet. A continuous portion of the continuous string of packets may also be used.

The server processing time $tp\_i$ can be obtained with the following equations:

$$tp\_i=(t\_j-t\_i)-td\_i-tt\_j$$

$$td\_i=1\_i/B$$

$$tt\_j=1\_j/B$$

Here, $t\_i$ is the monitor time of the packet from the client and $t\_j$ is the monitor time of the packet j from the server corresponding to the packet i; $td\_i$ is the transmission time of the packet i from the monitor to the server, which is obtained by dividing the size $1\_i$ of the packet i from the client by the network speed B; and $tt\_j$ is the sending time of the packet j from the server to the monitor, which is obtained by dividing the size $1\_j$ of the packet j from the server by the network speed B.

Mean values, probability distributions, or set values may be used as parameters. The server modeling module 18 outputs a set model to a server model module 19.

The service and server parameters may be calculated from all of the service log records or they may be calculated starting with the records used in the previous modeling. The parameters may also be calculated at regular time intervals. For services that are capable of affixing features according to the send/receive transmission content processed as part of the service (e.g., connection requests and connection establishment responses, or command transmissions, data transmissions, responses and ends), the above parameters may be calculated by processed content. The send/receive transmission units may be, for instance, "data send" and "ACK" for TCP and such pairs could be identified using sequence numbers. For example, for FIG. 3B, responses j1 and j2 and response k may make up a single send/receive transmission.

The service modeling module 16 and the server modeling module 18 may operate continually or they may be started or stopped remotely or at regular intervals.

Figure 9:
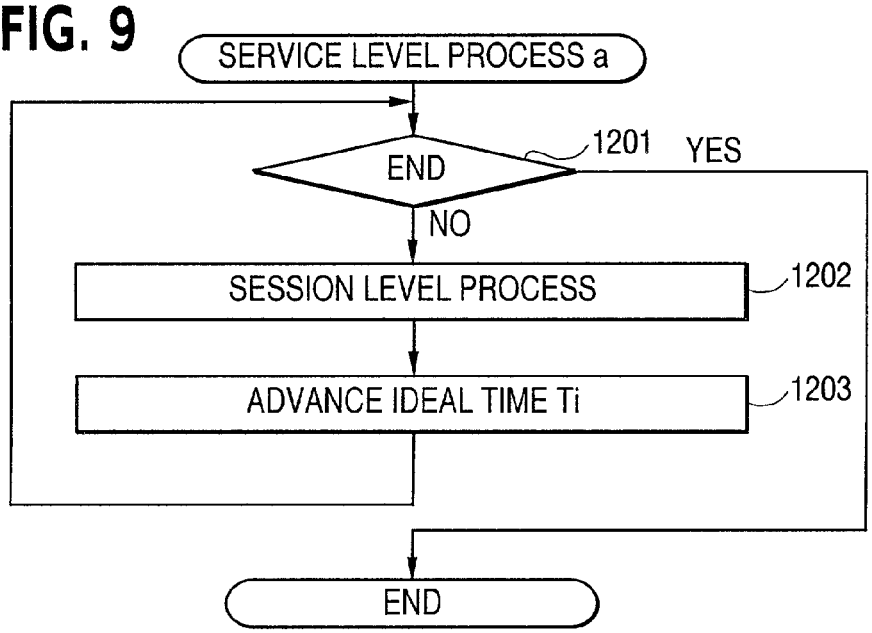
FIG. 9 is a flow chart of the service level simulation.
Figure 10:
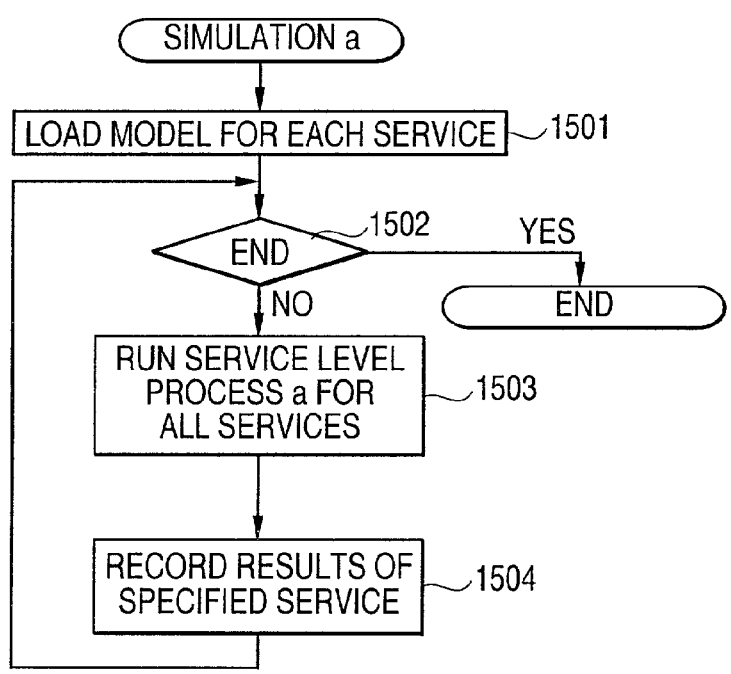
FIG. 10 is a simulation flow chart.

A simulator 20 takes a model from the service model module 17 and the server model module 19 and runs a simulation by executing process 1 (shown in FIG. 5), process 2 (shown in FIG. 6), process 3 (shown in FIG. 7), the session level process (shown in FIG. 8), the service level process (shown in FIG. 9), and simulation "a" (shown in FIG. 10). Details of each process will be discussed later.

The simulator may be operated with instructions from a server selection module 21 or it may be operated when the service model module 17 or the server model module 19 is updated.

The server selection module 21 runs the server permission prediction process (shown in FIG. 12) and the threshold value determining process (shown in FIG. 11) and indicates the appropriate server in response to server queries.

Figure 4:
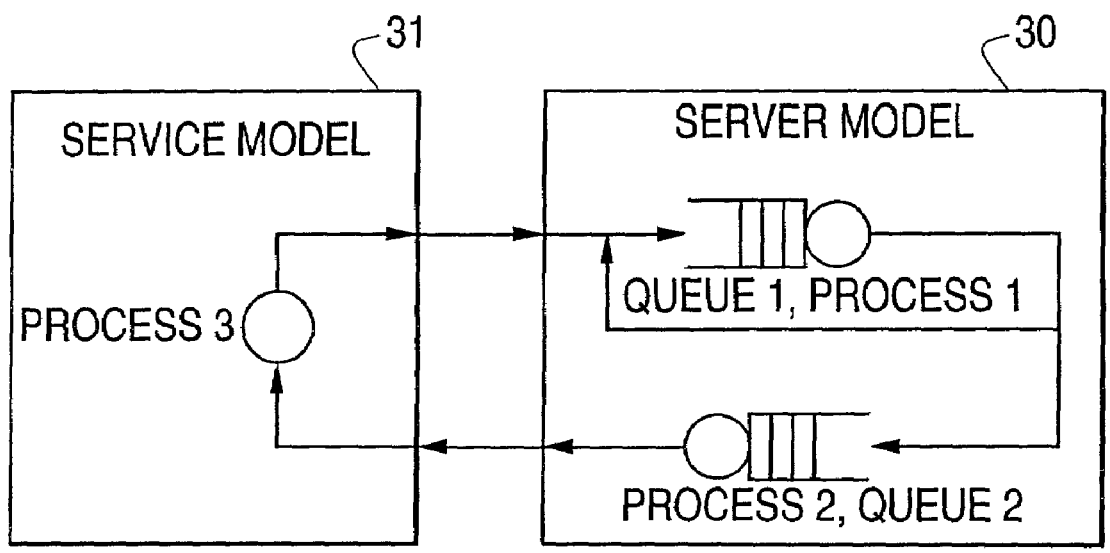
FIG. 4 shows the simulation model according to the present invention.
Figure 5:
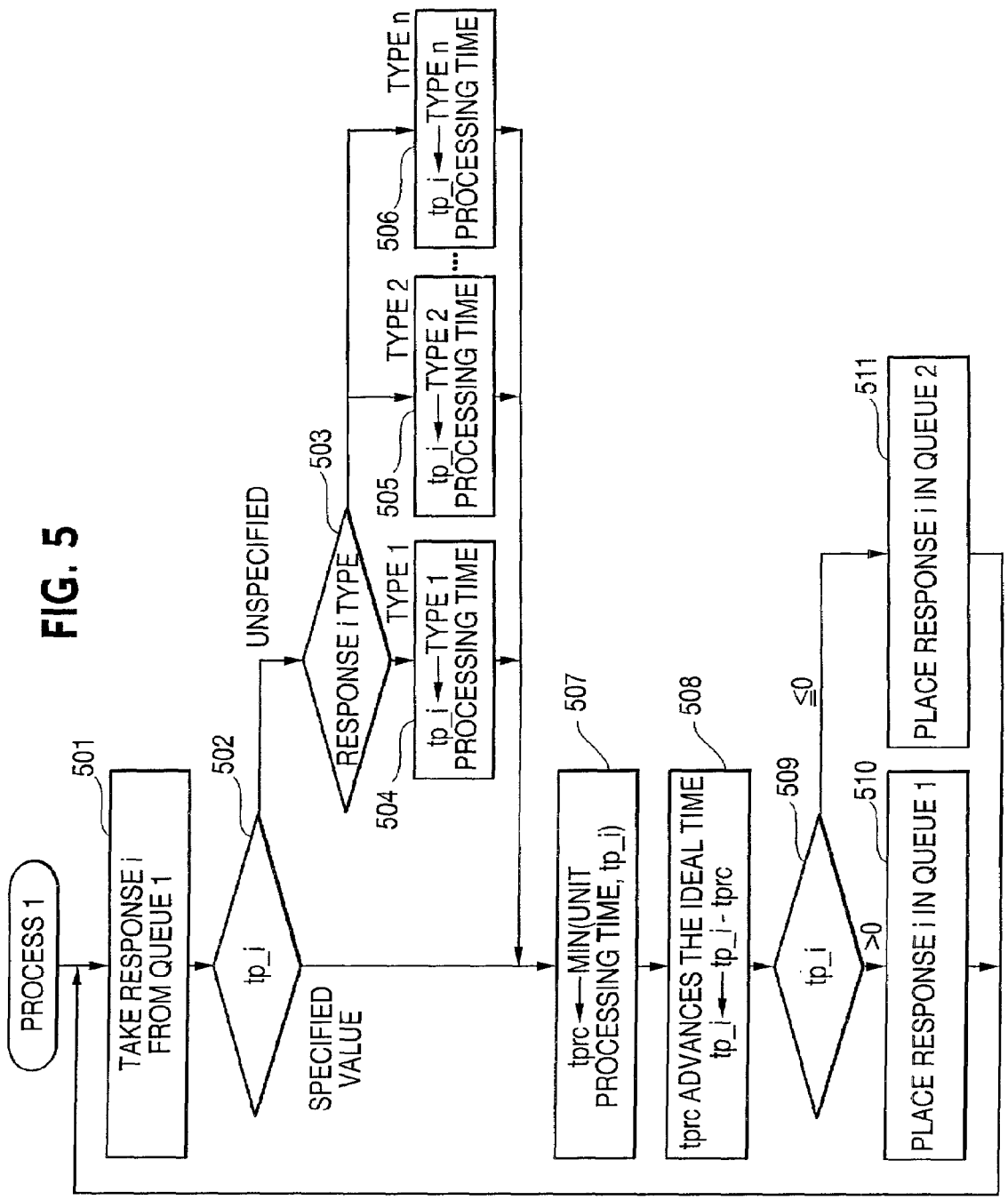
FIG. 5 is a flow diagram of the server model process 1.
Figure 6:
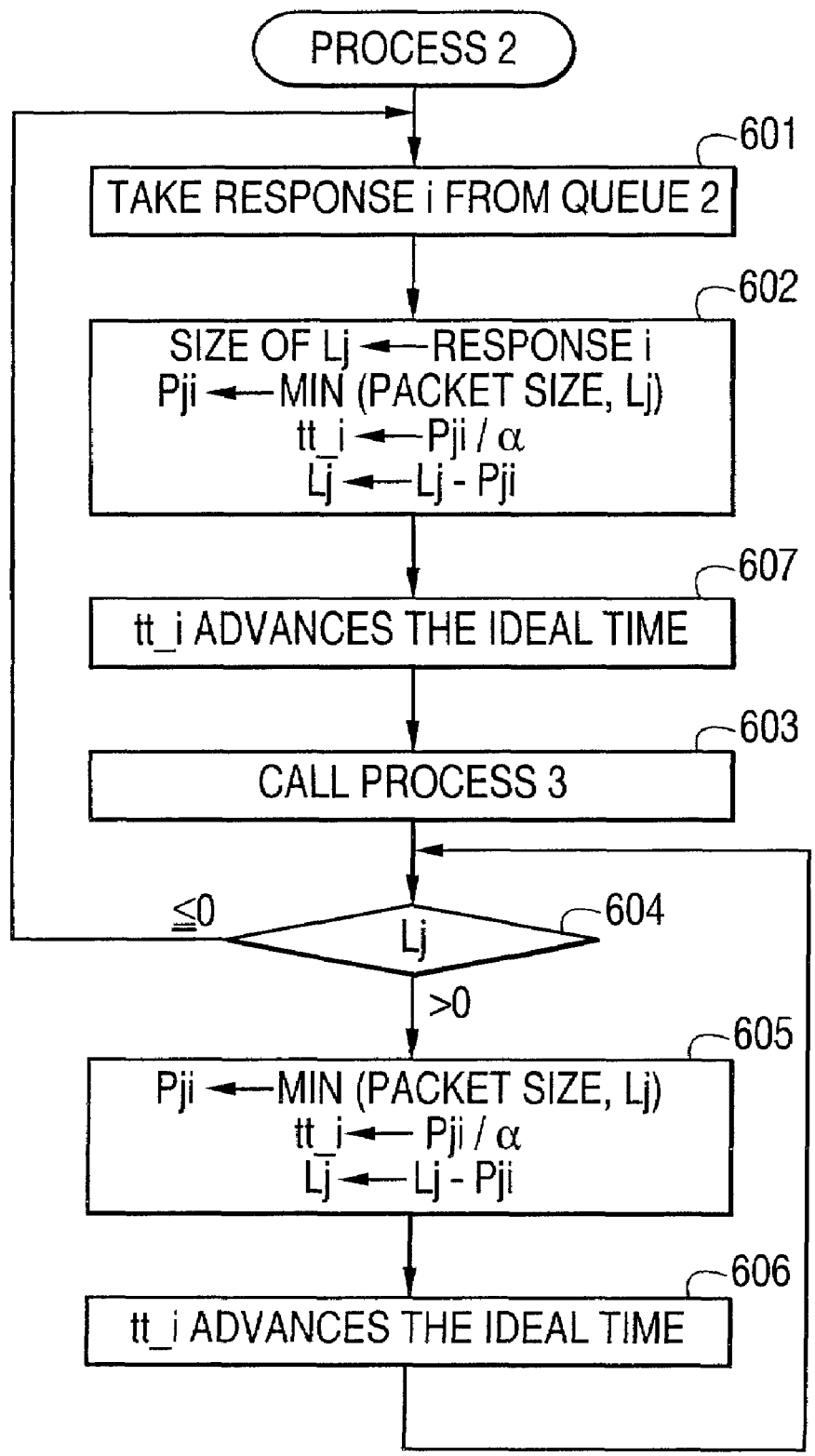
FIG. 6 is a flow diagram of the server model process 2.

The server model process flow is explained by referring to FIGS. 4–6. The service and server simulation models are shown in FIG. 4. A server model 30 has two queues (queue 1 and queue 2) and processes 1 and 2. The service model 31 has process 3.

The server model 30 operation will be described first. The process 2 queue (queue 2) corresponds to a server network output process and process 1 corresponds to a CPU process, file process, or other process. In a simulation, the client's response goes into queue 1 and after process 1 is finished, it enters queue 2. After process 2 is finished, the server's response emerges from the server model 30. Queues 1 and 2 may be FIFO or they may be a prioritized FIFO.

The flow chart for process 1 is shown in FIG. 5. First, answer i is taken from queue 1 at 501. The server processing time tp_i of response i is not initially set. If tp_i is not set at 502, then the server processing time tp_i is set based on response i's type at 502, which may range from type 1 at 504 to type n at 506. The server processing time tp_i does not have to be based on type. The total server processing time is the server processing time of the server parameters.

Then, the processing time for a single process tprc in the server is determined at 507 as the smaller of the unit processing time and tp_i. The unit processing time may be a set value. Next, the server process is modeled for response i, advancing the ideal time tprc inside the simulation module and reducing tp_i by tprc at 508. If tp_i is positive at 509, the response i is placed in queue 1 at 510. If tp_i is zero or negative at 509, the response i is placed in queue 2 at 511. That is, response i will be fed back into queue 1 and process 1 will be repeated until tp_i becomes zero or less.

FIG. 6 shows the flow chart for process 2. Process 2 is the model of the server response j, which answers the response i. First, response i is obtained from queue 2 at 601. Then, the size of response j, Lj, is initially set at 602 considering the service type or protocol for response i. For example, if response i is a GET command packet in hypertext transfer protocol (HTTP), Lj is set to the file size specified by the GET command. The size of a packet going between the client and the server, Pji, is determined as the the smaller of the packet size (the maximum size of a packet going over the network) and Lj at 602. The server transmission time tt_i is calculated by dividing Pji by the server transmission throughput α, and Lj is reduced by Pji at 602. The ideal time tt_i is advanced at 607, then process 3 of the service model is called at 603. Process 3 is described below.

If Lj is positive at 604 (when the response j has multiple packet transmissions), then Pji is set as the smaller of the packet size (the maximum size of a packet going over the network) and Lj at 605. The server transmission time tt_i is again calculated by dividing Pji by the server transmission throughput α, and Lj is reduced by Pji at 605. The ideal time tt_i is then advanced at 606 when the response j has multiple packet transmissions. The starting packet in response j is called by process 3 of the service model 31.

In determining Pji, the packet size is the maximum size (MTU or maximum transfer unit) of a packet going over the network. An MTU may be obtained, for instance, from a router in the same segment using simple network management protocol (SNMP). An MTU may also be calculated with the commonly used path MTU discovery method or set values may be used.

Figure 7:
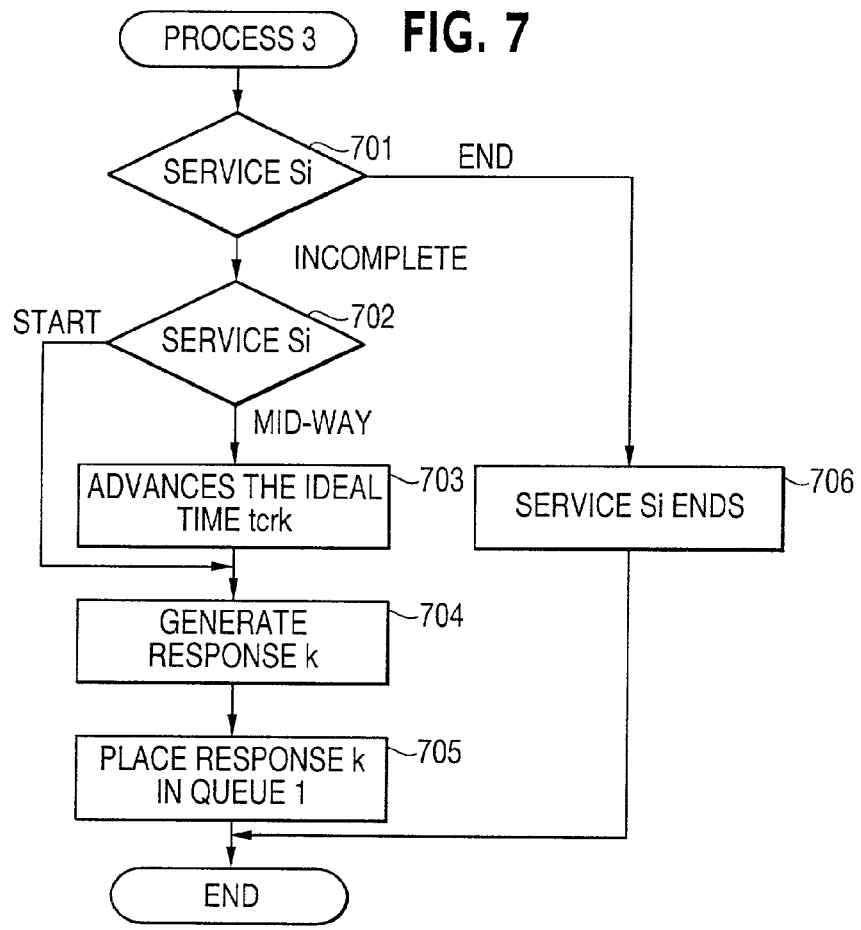
FIG. 7 is a flow chart of the service model process 3.
Figure 8:
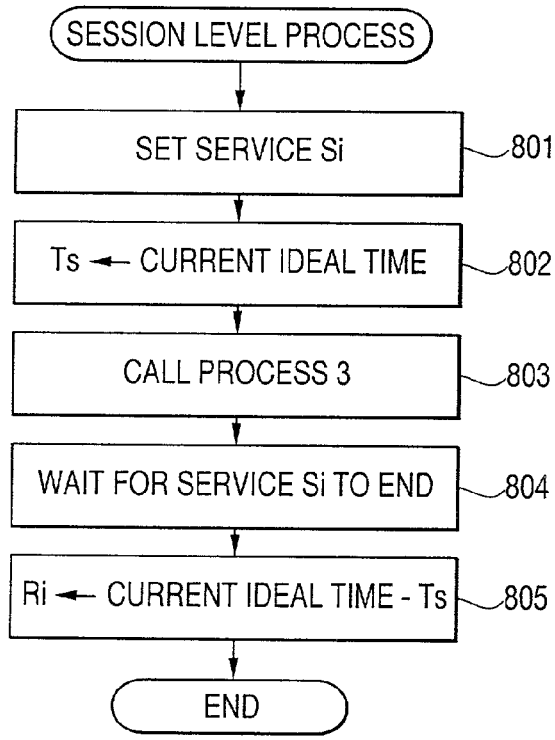
FIG. 8 is a flow chart of the session level simulation.

The service model 31 process flow is explained by referring to FIGS. 7 and 8. The process 3 flow chart of the service model 31 is shown in FIG. 7. Process 3 models the response of the client in response to the packet from the server. Process 3 is executed at the start of each session and after the server responses.

One or more services may be simulated. Thus, it is first determined at 701 whether the corresponding service or previously modeled service is complete. This may be determined by, for example, whether a set number of transmissions have been reached or whether the size of all data sent or received has reached a specific value. Then, it is determined whether a service has started at 702. When a service has not started, there will be a client response, so the ideal time is advanced by the client response time (tcrk) at 703 and the client response k is generated at 704. The settings for the client response k may be the packet size or response type. Finally, response k is placed into queue 1 at 705.

FIG. 8 shows the session level process flow (from start to completion). First, the session flows (service Si) are set from the parameters of the service model at 801. When the session level process is called, the starting time Ts of the session is set to be the ideal time at 802. Process 3 of the service model is called at 803, and then the session level process waits for the completion of the service Si at 804. When the service Si is completed, the service time Ri is determined at 805 from the difference between the completion time (current ideal time) and the session starting time Ts. Ri is recorded as a sample value for calculating the simulation results.

FIG. 9 shows the flow for service level process "a". First, it is determined whether the simulation has ended at 1201 by determining, for example, whether the total specified simulation time has elapsed, whether a steady state failure was detected in any queues, or whether the number of simulation results has reached a specific value. Then, a session level process is performed (FIG. 8) at 1202, and the ideal time Ti is advanced at 1203. The service level process "a" runs the session level process at every service time interval Ti constituting the modeling of a single session.

FIG. 10 shows the flow of simulation "a". First, the model for each service is loaded at 1501. Then, it is determined whether the simulation has ended at 1501, as described above for FIG. 9. Next the service level process "a" is run for all services at 1503, and the results of the specified services are recorded at 1504.

Figure 11:
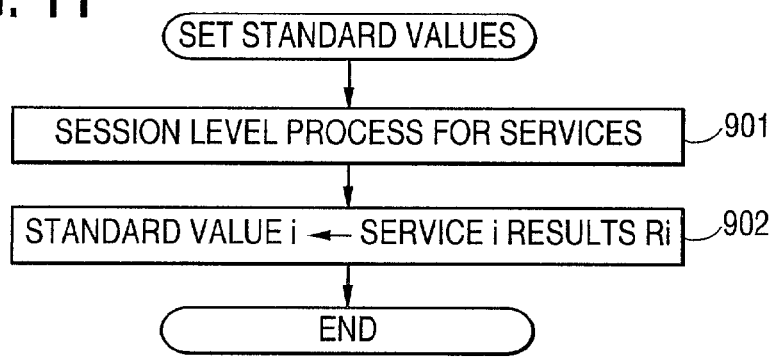
FIG. 11 is a flow chart of the standard values set up for a service.

FIG. 11 shows the flow for calculating the standard value using the server selection. First, the session level process for service i is run at 901. The standard value i is set at 902 as the result Ri of the service i.

The server selection judges the simulation results as being low load, high load, or overloaded, and the object of the comparison with those results is the standard value. A high load state is defined as a state having a longer service time because services wait to be processed, while an overloaded state is defined as a state having services that cannot be processed. The standard values are the results of simulation evaluations for just one session for each service. The judgment that the simulation results are low load, high load or overloaded may be based, for example, on whether the ratio of the results to the standard value are in excess of a certain threshold, or whether the difference between the results and the standard value are in excess of a certain threshold.

Figure 12:
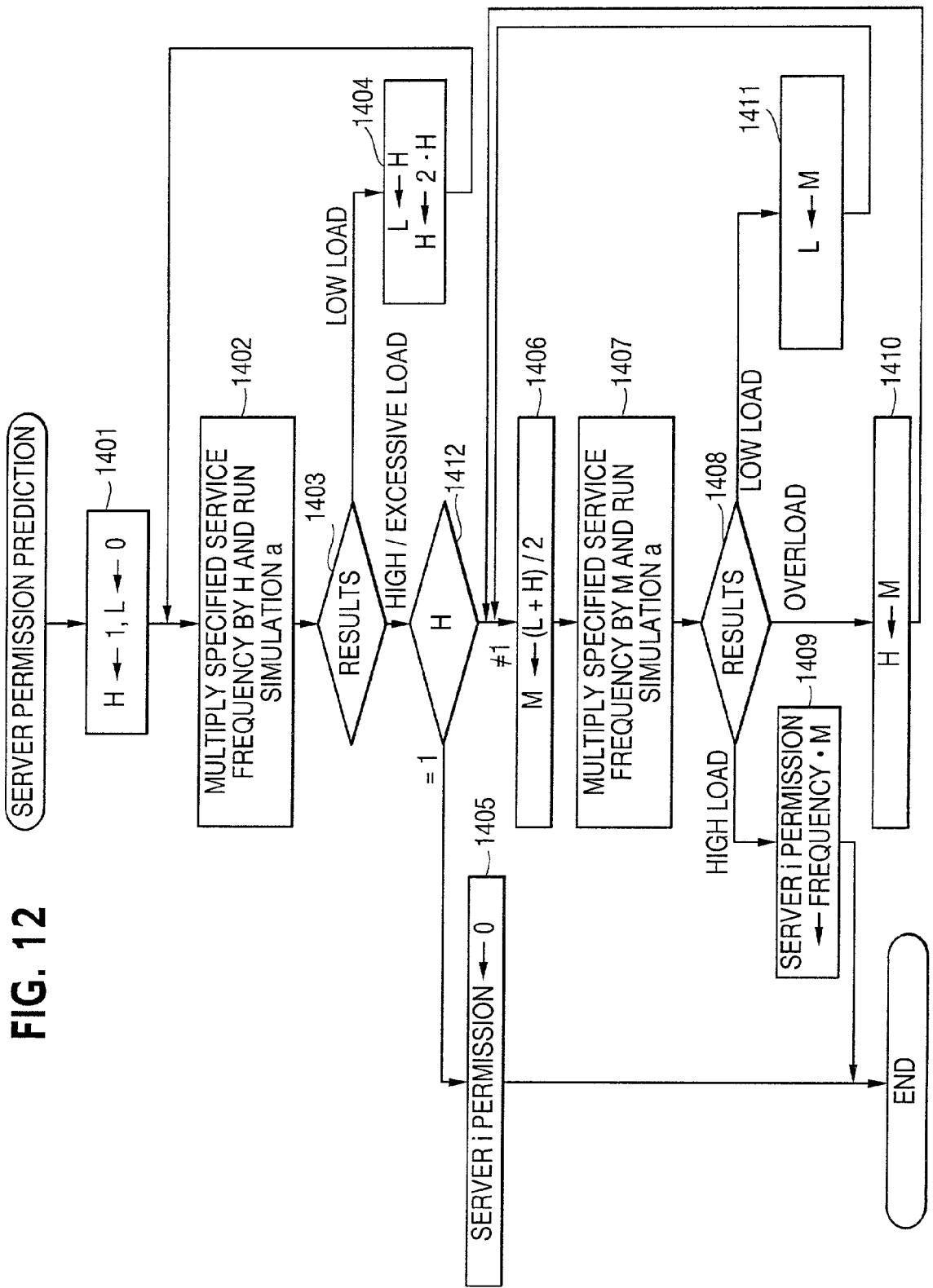
FIG. 12 is a flow chart of the prediction of the degree of permission for a server.

FIG. 12 shows the server permission prediction flow used in server selection. To begin server permission prediction, a variable H is initialized to 1 and a variable L is initialized to 0 at 1401. Then, the specified service frequency is multiplied by H, and simulation "a" is run at 1402. Next, the state is determined at 1403 to be low load, high load, or overloaded. When a low load state exists at 1403, L is set to H and the value of H is doubled, and the process again multiplies the specified service frequency by H and runs a simulation at 1402.

When a high load/overloaded state exists, the process determines at 1412 whether the H value is equal to 1. If the H value is 1, the permission of the server i is set to 0 at 1405 and the process ends. When the H value is not 1, a variable M is set at 1406 to the value (L+H)/2. Then, the specified service frequency is multiplied by M, and simulation "a" is run at 1407. The state is again determined at 1408. When the processing results indicate a low load, L is set to M at 1411, and M is again set to (L+H)/2 at 1406. When the processing results indicate an overload at 1408, H is set to M at 1410 and M is again set to (L+H)/2 at 1406. When the processing results indicate a high load at 1408, the process ends with the permission of the server i being set to M times the frequency of the specified service at 1409.

The server permission is, for example, the maximum service frequency or the minimum service interval possible without causing the server to go into a high load or an overloaded state. Thus, the first step is to run a simulation at the service frequency of the current service model and double the frequency until a high load/overloaded state is reached at 1401–1404.

When the current frequency indicates a high load or an overload at 1412, the permission is set to zero at 1405. If not, he service frequency for which the simulation results indicate a high load are calculated using a binary search method.

Figure 13:
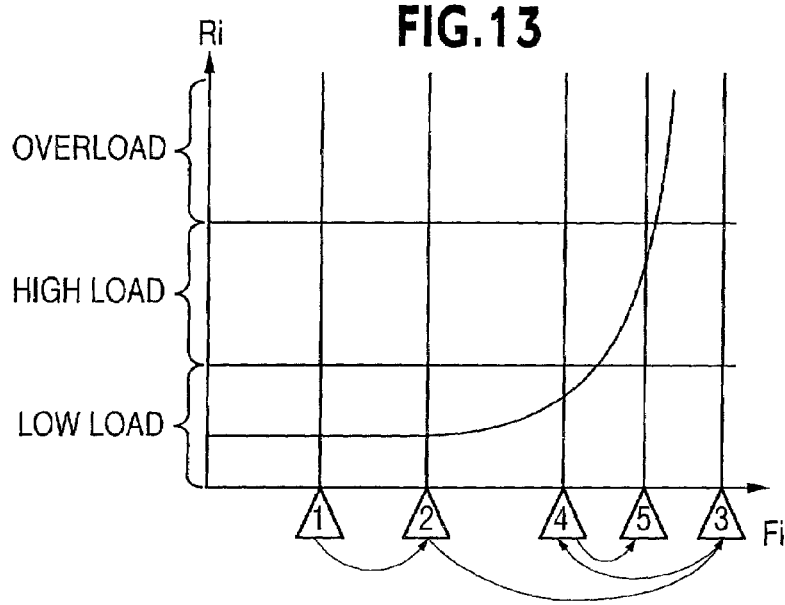
FIG. 13 shows an example of a search for the degree of permission.

Permission searching and server permission prediction are explained by referring to FIG. 13. The horizontal axis in FIG. 13 is the service frequency (in other words, the server load), while the vertical axis is the required service time. Because the results for the initial frequency 1 indicate a low load, the frequency is doubled. The results between frequency 2 and frequency 3 cause an overload, so a binary search is run. A simulation is run for frequency 4, which is between the immediately preceding frequency 2 and frequency 3, which caused the overload. Frequency 4 is a low load, so a simulation is again run. The result is a high load, so frequency 5 is calculated, between frequencies 4 and 3, and frequency 5 becomes the server permission.

When the server selection module 21 receives a query from a server that it distributes to, each of the servers performs the flow sequence shown in FIG. 12 and calculates the permission of the service in question. Next, the server having the largest difference between the permission and the current frequency is specified as the server to be distributed to.

Figure 14:
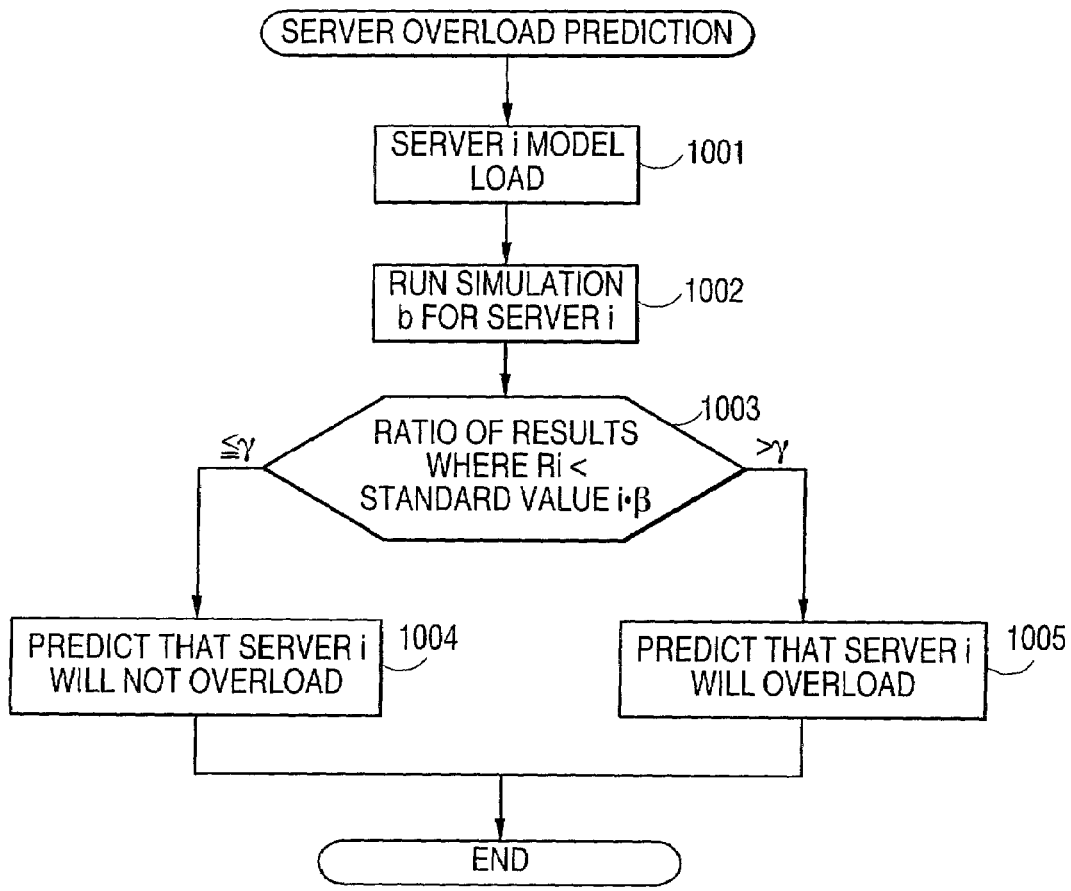
FIG. 14 is a flow chart of the server load prediction for a server.
Figure 15:
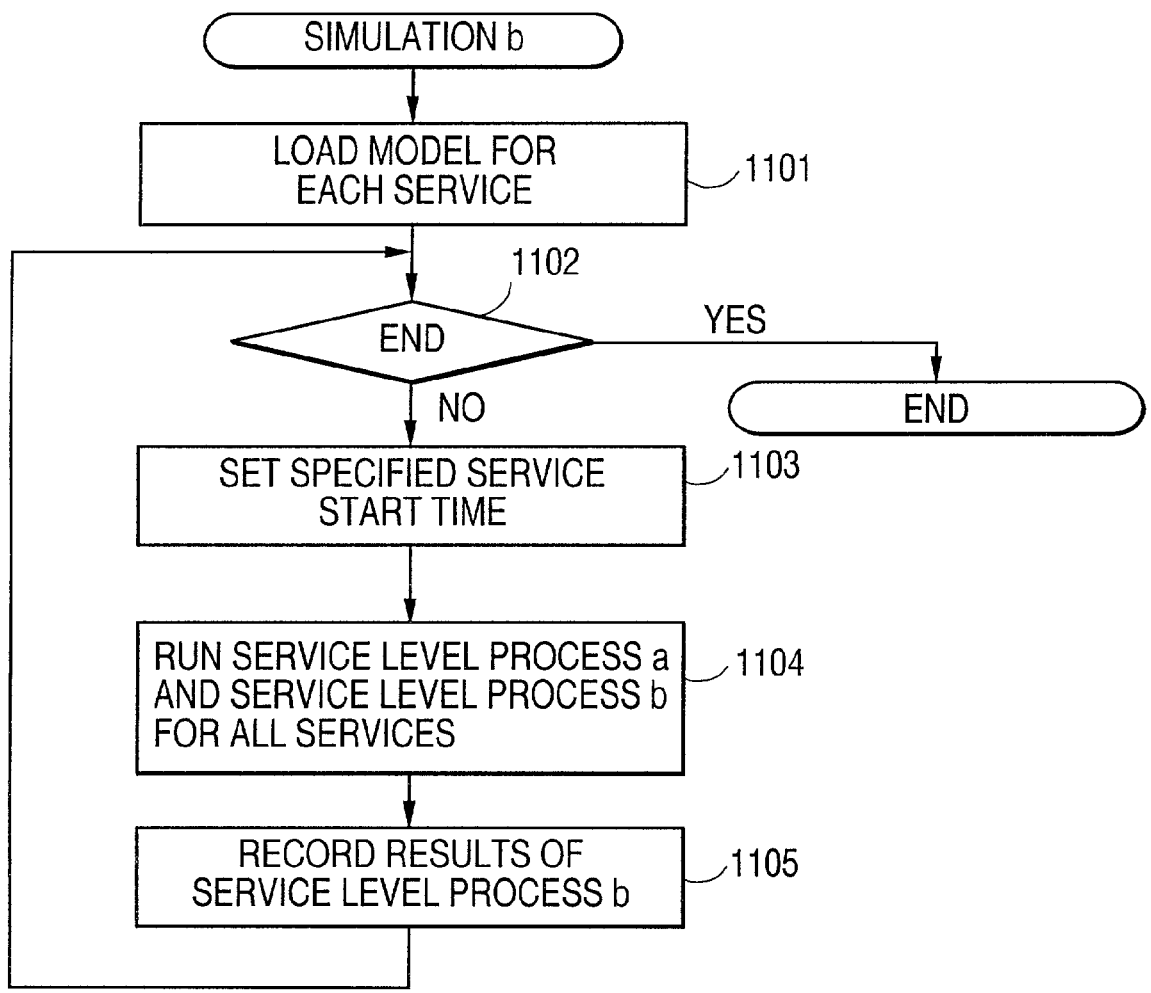
FIG. 15 is another simulation flow chart.
Figure 16:
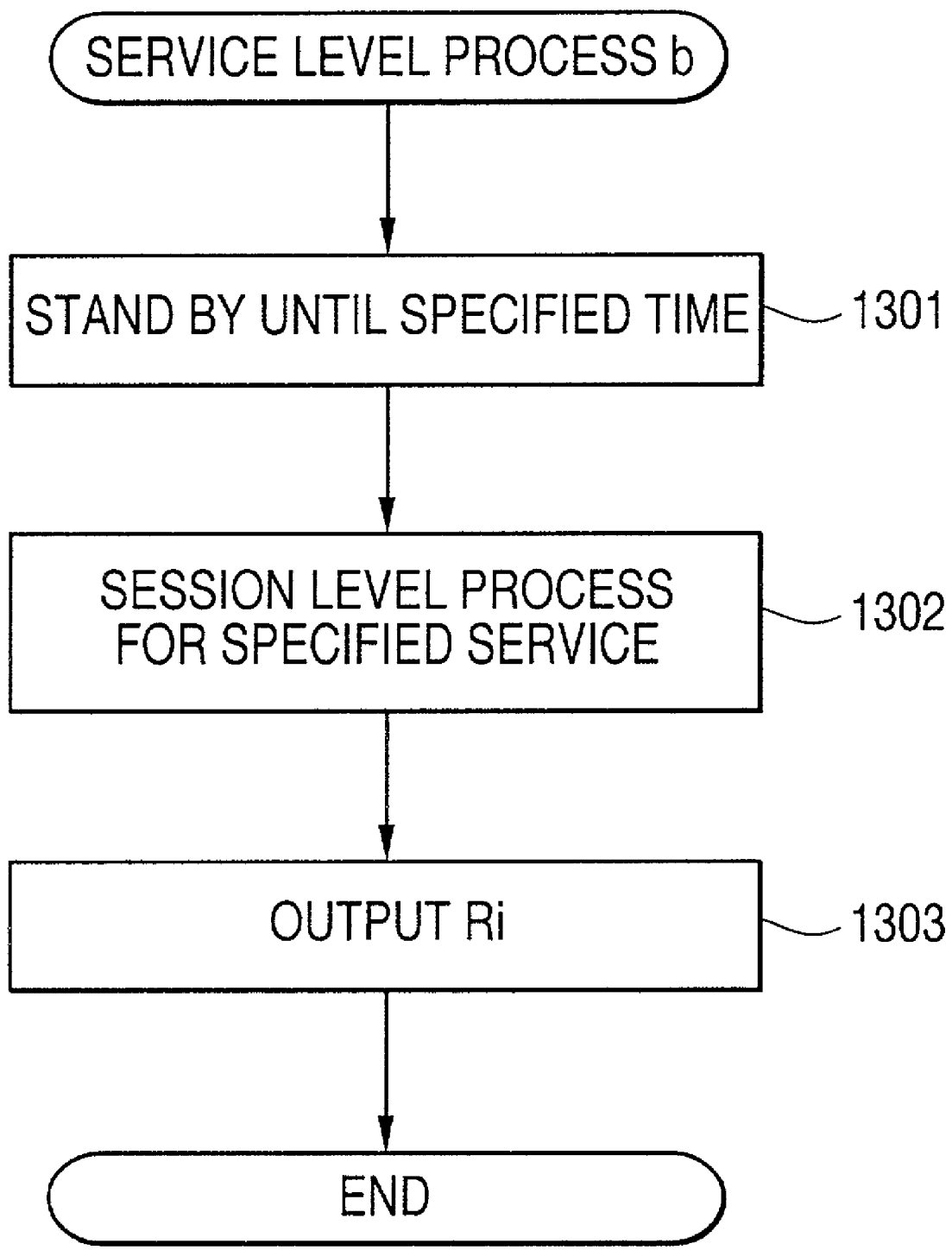
FIG. 16 is another flow chart of the service level simulation.

A second embodiment of the present invention is described by referring to FIGS. 14–16. During server selection, when a query about a service is received from a server that is distributed to, the servers each run a server overload prediction. In the event the server overload prediction distributes a new service to a server, a simulation is run to determine whether an overloaded state will result.

FIG. 14 shows the server overload prediction flow. First, the server i model is loaded at 1001, and simulation "b" (to be described later, see FIG. 15) for the server i is run at 1002.

The percentage of the simulation results Ri that exceed the standard value i by β times is calculated at 1003. If that value is less than or equal to γ, the server overload prediction predicts there will be no overload at 1004. If the percentage is larger than γ, the server overload prediction predicts there will be an overload at 1005. β and γ may be specific values.

β is the ratio of threshold value to a standard value i. For example, one of the factors used to determine whether the server is overloaded is the average time per one session. Assuming the standard value (FIG. 11) is 1 second, the value of β is 5, and the result of simulation "b" (FIG. 14 at 1002) is 4, the server is determined not to be overloaded. If the result of simulation "b" is 6, then the server is determined to be overloaded.

γ is a threshold value used to determine whether the server is overloaded. γ is the ratio of the number of overloaded cases to the total number of cases. For example, when the total number of cases is 1000, the number of overloaded cases is 600, and γ is 0.7, the server is determined not to be overloaded.

The simulation "b" used in predicting an overload, is described using FIG. 15. The difference between the flow for simulation "b" and the previously described flow for simulation "a" is that the process for the specified service is added for simulation "b". First, a model for each service is loaded at 1101, and then the process determines whether the simulation is complete at 1102. When the simulation is incomplete, the start time is set at 1103 within the simulation for the specified service for each simulation. The settings may be chosen using random numbers, functions, or specific values. In addition to the service level process "a" shown in FIG. 9 above, the service level process "b" shown in FIG. 16 (to be described later) is run at 1104. The results of the service level process "b" are recorded at 1105.

The following is a description of the service level process "b" shown in FIG. 16. The process waits until the specified time at 1301 and then runs the session level process for the specified service at 1302. Finally, the simulation results Ri (service time) are output at 1303. The difference between the service level process "b" shown in FIG. 16 and the service level process "a" shown in FIG. 9 is that service level process "b" waits until the specified time at 1301, and runs just one session at 1302.

The server selection module 21 selects the server that will not enter into an overloaded state, based on the server overload prediction. Alternatively, in FIG. 14, rather than predicting whether the server will overload at 1005 or will not overload at 1004, the server with the lowest rate of overload results may be selected.

Figure 17:
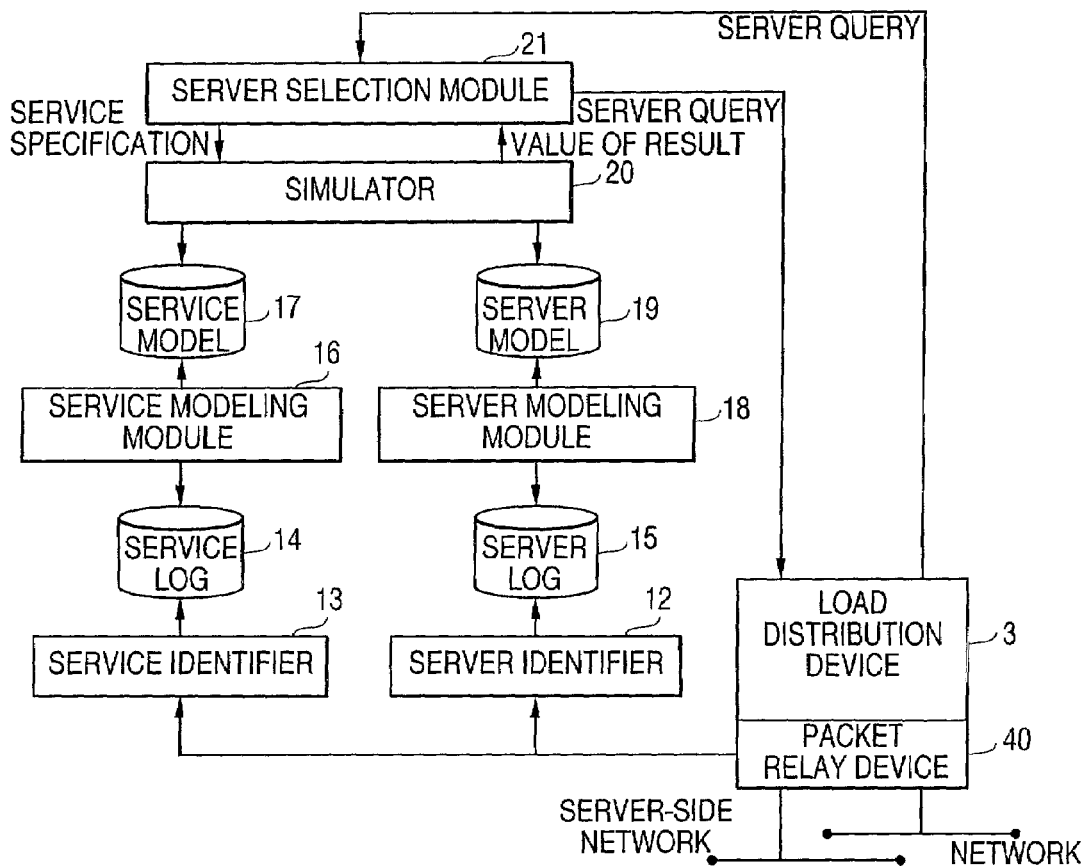
FIG. 17 shows another configuration of the server distributing device according to the present invention.

A third embodiment of the present invention is shown in FIG. 17. As shown in FIG. 17, the server distribution device 1 may be mounted on the load distribution device 3 and packets may be taken from a packet relay device 40.

In a fourth embodiment of the present invention, the permission of each server may be distributed by service and given a weighted value, or the relative ratio of the permission may be used as the service distribution ratio, or a weighted round robin may be used to distribute the services among the servers.

In the server permission prediction flow shown in FIG. 12, the permission $C_i$ of each server is calculated and used as a weighted value. As an alternative, the permission $C_i$ may be converted to the ratio $R_i$ using the following formula, where the ratio $R_i$ is used as the service distribution ratio:

$$Ri = Ci/SCi$$

The distribution ratio or the weighted values may be calculated, or they can be set by running the flow in FIG. 12 regularly, or the user may respecify the values.

Figure 18:
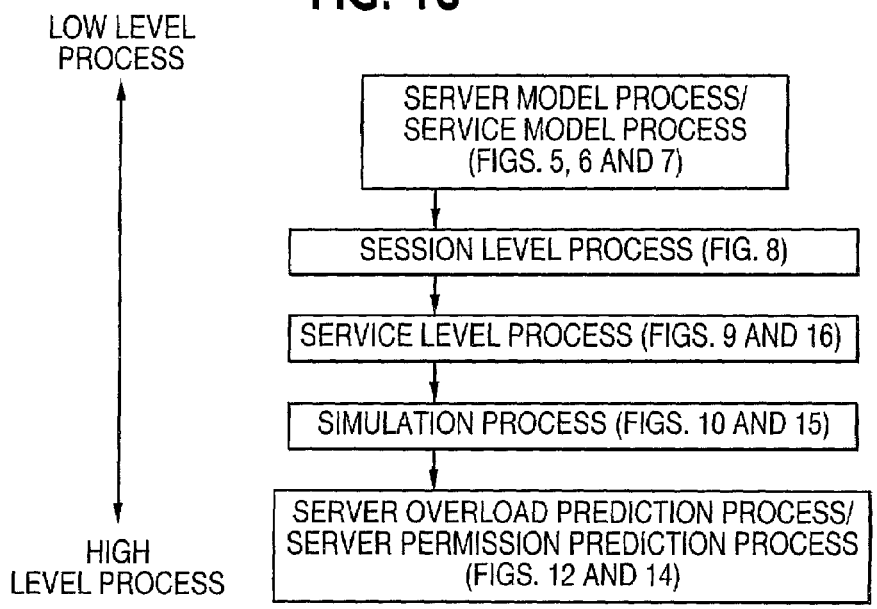
FIG. 18 shows each of the processing systems in this invention.

The processing system types found in this invention are shown in FIG. 18. The lowest level processes are the server model process/service model processes shown in FIG. 5, FIG. 6, and FIG. 7. The process at the next stage is the session level process shown in FIG. 8. The next stage is the service level process shown in FIG. 9 and FIG. 16. The next stage is the simulation process shown in FIG. 10 and FIG. 15. The highest level processes are the server overload prediction process/server permission prediction process shown in FIG. 12 and FIG. 14. The server selection process in the server selection module 21 is run based on the results of the final server overload prediction process/server permission prediction process.

This invention makes balanced load distribution for servers possible without placing them in a high load or overloaded state.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A service distribution device for distributing specified services among a plurality of servers in which there is a difference in processing capacity on a network to balance the server loads, comprising:
    a packet capture device capturing packets transmitted through the network to calculate the server processing time and parameters to configure simulation models;
    a server identifier recording information pertaining to the captured packets into a server log for each server;
    a service identifier recording information pertaining to the captured packets into a service log for each service;
    a server modeling module setting up a simulation model for each server from the server log;
    a service modeling module setting up a simulation model for each service from the service log;
    a simulator reading in the server model and the service model and running each simulation; and
    a server selection module selecting and specifying an optimum server to distribute services to based on a simulator result,
    wherein said simulator performs a simulation using the server model and the service model and generates a mean value or a median value of a session time for the specific service.

2. The service distribution device of claim 1, further comprising a packet relay device obtaining packets using a packet capture module mounted on said packet relay device, which relays packets between a client and the servers.

3. A service distribution device for distributing specified services among a plurality of servers in which there is a difference in processing capacity on a network to balance the server loads, comprising:
    a packet capture device capturing packets transmitted through the network to calculate the server processing time and parameters to configure simulation models;
    a server identifier recording information pertaining to the captured packets into a server log for each server;
    a service identifier recording information pertaining to the captured packets into a service log for each service;
    a server modeling module setting up a simulation model for each server from the server log;
    a service modeling module setting up a simulation model for each service from the service log;
    a simulator reading in the server model and the service model and running each simulation; and
    a server selection module selecting and specifying an optimum server to distribute services to based on a simulator result,
    wherein said server modeling module constructs a server model having a queue corresponding to a transmission process using the server log and a server transmission throughput, a server processing time, and a unit processing time as parameters,
    wherein the server transmission throughput is calculated from a total size L of an arbitrary, continuous string of the continuously transmitted packets using the formula $L/(t_e - t_s)$ where $t_e$ is an ending packet capture time and $t_s$ is a starting packet capture time, and
    wherein the server processing time is calculated using the formula $(t_s - t_c) - (l_s + l_c)/B$, wherein $t_s$ and $l_s$ are the capture time and size of a server response packet, respectively, $t_c$ and $l_c$ are the capture time and size of a corresponding client response packet, respectively, and B is a network speed.

4. A service distribution device for distributing specified services among a plurality of servers in which there is a difference in processing capacity on a network to balance the server loads, comprising:
    a packet capture device capturing packets transmitted through the network to calculate the server processing time and parameters to configure simulation models;
    a server identifier recording information pertaining to the captured packets into a server log for each server;
    a service identifier recording information pertaining to the captured packets into a service log for each service;
    a server modeling module setting up a simulation model for each server from the server log;
    a service modeling module setting up a simulation model for each service from the service log;
    wherein said service modeling module calculates the following parameters from the service log by constructing a service model for each service:
        a ratio of the number of sessions for each service to the number of sessions for all services,
        a session starting frequency or time interval,
        a number of transmissions between the client and server per session,
        a client response size, packet size, and packet count per transmission,
        a server response size, packet size, and packet count per transmission, and
        a time from the server response until the client response;
    a simulator reading in the server model and the service model and running each simulation; and
    a server selection module selecting and specifying an optimum server to distribute services to based on a simulator result.

5. The service distribution device of claim 1, wherein said server selection module determines a standard value using an output of a single simulation run for each service by said simulator, and determines that a high load state exists if a difference between, or the ratio of, the standard value and the output of the simulation of a plurality of sessions exceeds a predetermined threshold.

6. The service distribution device of claim 5, wherein when said server selection module receives a server distribution query, said server selection module sets a server permission to be a starting frequency of the session that will cause a high load state for the service in question for each server, and specifies a server having the biggest difference between the session starting frequency and the permission as a server for distribution.

7. A service distribution device for distributing services among a plurality of servers on a network to balance the server loads, comprising:
   a packet capture device capturing packets transmitted through the network;
   a server identifier recording information pertaining to the captured packets into a server log for each server;
   a service identifier recording information pertaining to the captured packets into a service log for each service;
   a server modeling module setting up a simulation model for each server from the server log;
   a service modeling module setting up a simulation model for each service from the service log;
   a simulator reading in the server model and the service model and running each simulation; and
   a server selection module selecting and specifying an optimum server to distribute services to based on a simulator result,
   wherein said server selection module determines a standard value using an output of a single simulation run for each service by said simulator, and determines that a high load state exists if a difference between, or the ratio of, the standard value and the output of the simulation of a plurality of sessions exceeds a predetermined threshold,
   wherein when said server selection module receives a distribution server query, said server selection module runs a simulation for a service in question for each server and specifies a server for which a result of a ratio for which $\beta$ multiplied by the standard value is less than or equal to $\gamma$, and
   wherein $\beta$ is a ratio of the threshold to the standard value, and $\gamma$ is a ratio of a number of overloaded cases to a total number of cases.

8. A service distribution device for distributing services among a plurality of servers on a network to balance the server loads, comprising:
   a packet capture device capturing packets transmitted through the network;
   a server identifier recording information pertaining to the captured packets into a server log for each server;
   a service identifier recording information pertaining to the captured packets into a service log for each service;
   a server modeling module setting up a simulation model for each server from the server log;
   a service modeling module setting up a simulation model for each service from the service log;
   a simulator reading in the server model and the service model and running each simulation; and
   a server selection module selecting and specifying an optimum server to distribute services to based on a simulator result,
   wherein said server selection module determines a standard value using an output of a single simulation run for each service by said simulator, and determines that a high load state exists if a difference between, or the ratio of, the standard value and the output of the simulation of a plurality of sessions exceeds a predetermined threshold,
   wherein when said server selection module receives a distribution server query, said server selection module runs a simulation for a service in question for each server and specifies as a distribution server, a server for which a result of ratio for which $\beta$ multiplied by the standard value is smallest, and
   wherein $\beta$ is a ratio of the threshold to the standard value.

9. A service distribution device for distributing services among a plurality of servers on a network to balance the server loads, comprising:
   a packet capture device capturing packets transmitted through the network;
   a server identifier recording information pertaining to the captured packets into a server log for each server;
   a service identifier recording information pertaining to the captured packets into a service log for each service;
   a server modeling module setting up a simulation model for each server from the server log;
   a service modeling module setting up a simulation model for each service from the service log;
   a simulator reading in the server model and the service model and running each simulation; and
   a server selection module selecting and specifying an optimum server to distribute services to based on a simulator result,
   wherein said service modeling module calculates the following parameters from the service log by constructing a service model for each service
      a ratio of the number of sessions for each service to the number of sessions for all services,
      a session starting frequency or time interval,
      a number of transmissions between the client and server per session,
      a client response size, packet size, and packet count per transmission,
      a server response size, packet size, and packet count per transmission, and
      a time from the server response until the client response, and
   wherein said service modeling module categorizes each session transmission as a connection request from a client and a response from a server in response to the connection request, and a command transmission, a data transmission, a response occurring after establishing a connection between a server and a client, and an end, and calculates the parameters for each session transmission based upon category.

10. A service distribution device for distributing services among a plurality of servers on a network to balance the server loads, comprising:
    a packet capture device capturing packets transmitted through the network;
    a server identifier recording information pertaining to the captured packets into a server log for each server;
    a service identifier recording information pertaining to the captured packets Into a service log for each service;
    a server modeling module setting up a simulation model for each server from the server log;
    a service modeling module setting up a simulation model for each service from the service log;
    a simulator reading in the server model and the service model and running each simulation; and a server selection module selecting and specifying an optimum server to distribute services to based on a simulator result, wherein said server selection module determines a standard value using an output of a single simulation run for each service by said simulator, and determines that a high load state exists if a difference between, or the ratio of, the standard value and the output of the simulation of a plurality of sessions exceeds a predetermined threshold, wherein when said server selection module receives a server distribution query, said server selection module sets a server permission to be a starting frequency of the session that will cause a high load state for the service in question for each server, and specifies a server having the biggest difference between the session starting frequency and the permission as a server for distribution, and wherein the permissions of each of the servers are taken as weighted values of a service distribution, or relative ratios of the permissions are taken as server distribution ratios.

11. A service distribution device for distributing specified services among a plurality of servers in which there is a difference in processing capacity to balance server loads, comprising:

a server modeling module generating a simulation model for each server and a service modeling module generating a simulation model for each service based on a server log and a service log of captured server communication;

a simulator reading the server models and the service models and running a plurality of simulations; and a server selection module determining which servers have low loads based on results of the simulations and selecting the servers with low loads to receive the services, wherein said simulator performs a simulation using the server model and the service model and generates a mean value or a median value of a session time for the specific service.

12. A method for distributing specified services among a plurality of servers in which there is a difference in processing capacity to balance server loads, comprising:

generating a simulation model for each server and each service based on a server log and a service log of captured server communication;

running a plurality of simulations using the server and service models;

determining which servers have low loads based on results of the simulations and selecting the servers with low loads to receive the services; and performing a simulation using the server model and the service model and generating a mean value or a median value of a session time for the specific service.

13. A computer-readable storage controlling a computer to distribute services among a plurality of servers in which there is a difference in processing capacity and comprising a process of:

generating a simulation model for each server and each of a plurality of services based on a server log and a service log of captured server communication;

running a plurality of simulations using the server and service models;

determining which servers have low loads based on results of the simulations and selecting the servers with low loads to receive the services; and performing a simulation using the server model and the service model and generating a mean value or a median value of a session time for the specific service.

14. A service distribution device according to claim 1, wherein said server modeling module constructs a server model having a queue corresponding to a transmission process using the server log and a server transmission throughput, a server processing time, and a unit processing time as parameters, wherein the server transmission throughput is calculated from a total size L of an arbitrary, continuous string of the continuously transmitted packets using the formula $L/(t-e-t-s)$ where $t-e$ is an ending packet capture time and $t-s$ is a starting packet capture time, and wherein the server processing time is calculated using the formula $(ts-tc)-(ls+lc)/B$, wherein $ts$ and $ls$ are the capture time and size of a server response packet, respectively, $tc$ and $lc$ are the capture time and size of a corresponding client response packet, respectively, and $B$ is a network speed.

15. A service distribution device according to claim 1, wherein said service modeling module calculates the following parameters from the service log by constructing a service model for each service:

a ratio of the number of sessions for each service to the number of sessions for all services, a session starting frequency or time interval, a number of transmissions between the client and server per session, a client response size, packet size, and packet count per transmission, a server response size, packet size, and packet count per transmission, and a time from the server response until the client response.

16. A service distribution device according to claim 1, wherein said server selection module determines a standard value using an output of a single simulation run for each service by said simulator, and determines that a high load state exists if a difference between, or the ratio of, the standard value and the output of the simulation of a plurality of sessions exceeds a predetermined threshold, wherein when said server selection module receives a distribution server query, said server selection module runs a simulation for a service in question for each server and specifies a server for which a result of a ratio for which $\beta$ multiplied by the standard value is less than or equal to $\gamma$, wherein $\beta$ is a ratio of the threshold to the standard value, and $\gamma$ is a ratio of a number of overloaded cases to a total number of cases.

17. A service distribution device according to claim 1, wherein said server selection module determines a standard value using an output of a single simulation run for each service by said simulator, and determines that a high load state exists if a difference between, or the ratio of, the standard value and the output of the simulation of a plurality of sessions exceeds a predetermined threshold, wherein when said server selection module receives a distribution server query, said server selection module runs a simulation for a service in question for each server and specifies as a distribution server, a server for which a result of ratio for which $\beta$ multiplied by the standard value is smallest, and wherein $\beta$ is a ratio of the threshold to the standard value.

18. A server distribution device according to claim 1,
wherein said service modeling module calculates the following parameters from the service log by constructing a service model for each service:
- a ratio of the number of sessions for each service to the number of sessions for all services,
- a session starting frequency or time interval,
- a number of transmissions between the client and server per session,
- a client response size, packet size, and packet count per transmission,
- a server response size, packet size, and packet count per transmission, and
- a time from the server response until the client response, and wherein said service modeling module categorizes each session transmission as a connection request from a client and a response from a server in response to the connection request, and a command transmission, a data transmission, a response occurring after establishing a connection between a server and a client, and an end, and calculates the parameters for each session transmission based upon category.

19. A service distribution device according to claim 1,
wherein said server selection module determines a standard value using an output of a single simulation run for each service by said simulator, and determines that a high load state exists if a difference between, or the ratio of, the standard value and the output of the simulation of a plurality of sessions exceeds a predetermined threshold, wherein when said server selection module receives a server distribution query, said server selection module sets a server permission to be a starting frequency of the session that will cause a high load state for the service in question for each server, and specifies a server having the biggest difference between the session starting frequency and the permission as a server for distribution, and wherein the permissions of each of the servers are taken as weighted values of a service distribution, or relative ratios of the permissions are taken as server distribution ratios.

* * * * *

UNITED STATES PATENT AND TRADEMARK OFFICE
CERTIFICATE OF CORRECTION

| | | |
|---|---|---|
| PATENT NO. | : 7,184,945 B1 | |
| APPLICATION NO. | : 09/671120 | |
| DATED | : February 27, 2007 | |
| INVENTOR(S) | : Eiichi Takahashi et al. | |

It is certified that error appears in the above-identified patent and that said Letters Patent is hereby corrected as shown below:

Column 16, Line 42, change "pro-determined" to --pre-determined--.

Signed and Sealed this

Twenty-sixth Day of June, 2007

JON W. DUDAS
*Director of the United States Patent and Trademark Office*